(12) United States Patent
Iwanaga et al.

(10) Patent No.: US 6,652,949 B2
(45) Date of Patent: *Nov. 25, 2003

(54) METHOD FOR PRODUCING FIBER LAMINATE, FIBER LAMINATE PRODUCED BY THE METHOD, LIQUID RESERVOIR CONTAINING THE FIBER LAMINATE, AND LIQUID-JET HEAD CARTRIDGE HAVING THE RESERVOIR

(75) Inventors: Shuzo Iwanaga, Kawasaki (JP); Hajime Yamamoto, Yokohama (JP); Eiichiro Shimizu, Yokohama (JP); Kenta Udagawa, Kawasaki (JP); Kenji Kitabatake, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/546,910

(22) Filed: Apr. 10, 2000

(65) Prior Publication Data

US 2003/0087076 A1 May 8, 2003

(30) Foreign Application Priority Data

Apr. 15, 1999 (JP) .............................................. 11-107794
Dec. 17, 1999 (JP) .............................................. 11-358798

(51) Int. Cl.[7] ................................................ B32B 3/02
(52) U.S. Cl. ...................... 428/65.9; 428/218; 428/219
(58) Field of Search ............................... 428/65.9, 218, 428/219, 220, 408, 280, 292.1

(56) References Cited

U.S. PATENT DOCUMENTS

| 5,169,580 A | 12/1992 | Marcus ........................ 264/115 |
| 5,509,140 A | 4/1996 | Koitabashi et al. ........... 347/86 |
| 5,619,238 A | 4/1997 | Higuma et al. ................ 347/86 |
| 5,654,059 A * | 8/1997 | Hecht ......................... 428/65.9 |

FOREIGN PATENT DOCUMENTS

| EP | 567921 | 11/1993 |
| EP | 672771 | 9/1995 |
| EP | 879911 | 11/1998 |
| EP | 896079 | 2/1999 |
| JP | 6-40043 | 2/1994 |
| JP | 6-234197 | 8/1994 |
| JP | 7-125232 | 5/1995 |
| JP | 7-290475 | 11/1995 |
| JP | 9-248873 | 9/1997 |
| JP | 11-076650 | 3/1999 |
| WO | 96/41047 | 12/1996 |
| WO | 98/24958 | 6/1998 |

OTHER PUBLICATIONS

U.S. Patent Application Publication No. 2002/0006509, published Jan. 17, 2002.

* cited by examiner

*Primary Examiner*—Merrick Dixon
(74) *Attorney, Agent, or Firm*—Fitzpatrick, Cella, Harper & Scinto

(57) ABSTRACT

A fiber laminate production method includes a step of controlling an influence of gravity on a fiber absorber during thermoforming.

28 Claims, 20 Drawing Sheets

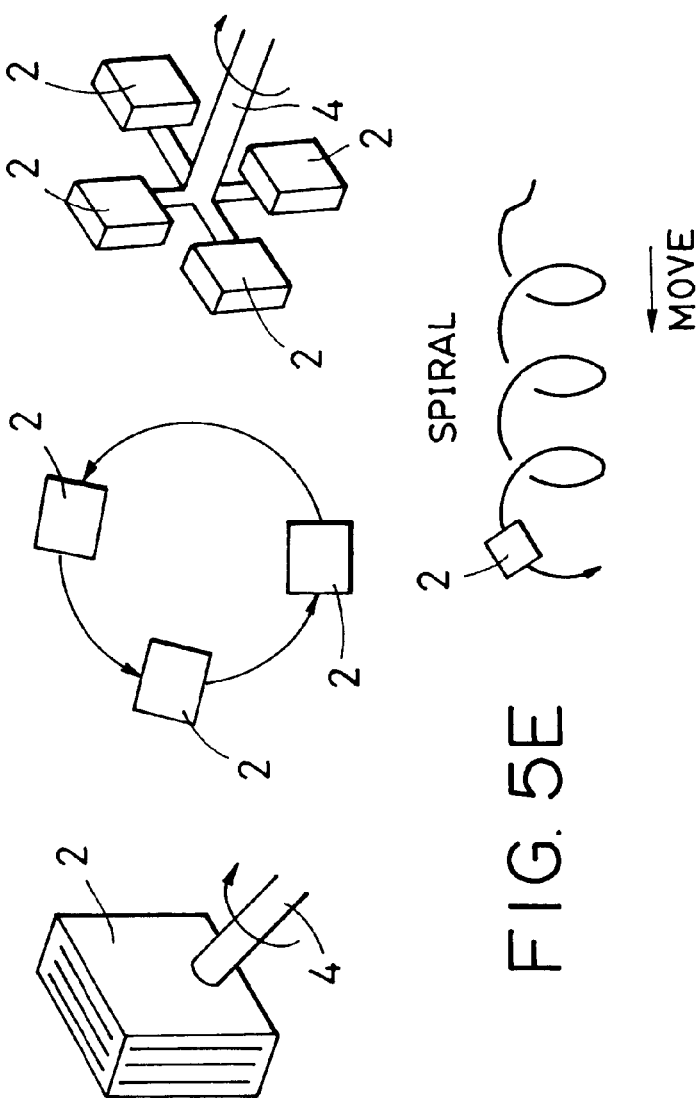
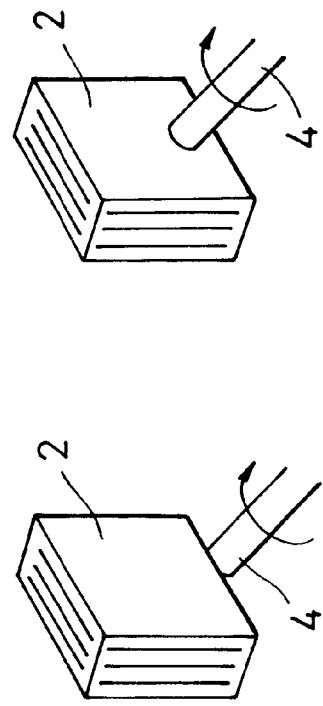
FIG. 5A  FIG. 5B  FIG. 5C  FIG. 5D
FIG. 5E

↓ GRAVITY DIRECTION

140

140

METHOD FOR PRODUCING FIBER LAMINATE, FIBER LAMINATE PRODUCED BY THE METHOD, LIQUID RESERVOIR CONTAINING THE FIBER LAMINATE, AND LIQUID-JET HEAD CARTRIDGE HAVING THE RESERVOIR

BACKGROUND OF THE INVENTION

1. Field of the Invention

The present invention relates to a method for producing a fiber laminate for holding liquid, a fiber laminate produced by the method, a liquid reservoir containing the fiber laminate, and a liquid-jetting head cartridge having the reservoir.

2. Description of the Related Art

In general, an ink tank (combined with a recording head or formed of a single replaceable tank) serving as a liquid reservoir for use in the field of liquid-jet recording (hereinafter also referred to as "ink-jet recording") has a structure for controlling the force for holding liquid (used for recording; including a type containing a colored component, and a type containing no colored component and for acting on liquid containing a colored component so as to improve recording quality; hereinafter also simply referred to as "ink") stored therein in order to properly supply the ink to a recording head for jetting liquid. This holding force is called "negative pressure" because it serves to make the pressure at an ink discharge portion of the recording head negative relative to atmospheric pressure (a member for generating such negative pressure will be also referred to a "negative pressure generating member").

The easiest method of generating such negative pressure is to use capillary force of an ink absorber, such as a urethane foam, provided inside the ink tank.

Japanese Patent Applications Laid-Open Nos. 7-125232 and 6-40043, to the same assignee, propose an ink tank including a liquid chamber using an ink absorber, in which the amount of ink to be contained per unit volume of the ink tank is increased, thereby obtaining a stable ink supply (this type of ink tank will be hereinafter referred to as a "combination ink tank" because it includes both a chamber containing an ink absorber and a chamber containing ink).

FIGS. 6A and 6B are cross-sectional views showing the general configuration of a combination ink tank having the above-described structure, and showing how ink is consumed.

Referring to FIGS. 6A and 6B, the interior of an ink cartridge 10 is divided into two spaces by a partition 38 having a communication hole (communicating portion) 40. One of the spaces serves as a liquid chamber 36 enclosed excluding the communication hole 40 of the partition 38 so as to directly hold ink, and the other space serves as a negative pressure generating member containing chamber 34 for containing a negative pressure generating member 32. The negative pressure generating member containing chamber 34 is provided with an atmospheric air communicating portion (air communication port) 12 and a supply port 14 for supplying ink to a recording head (not shown). Ribs 42 are arranged between the negative pressure generating member 32 and the atmospheric air communicating portion 12, thereby forming a buffer space 44.

A supply tube on the recording head side is in pressure contact with the inside of the supply port 14, and an ink lead-out member 46 is also provided therein which has a greater capillary force and a higher physical strength than those of the negative pressure generating member 32 and which serves to properly lead ink out of the negative pressure generating member 32.

In such an ink tank configuration, when the ink in the negative pressure generating member 32 is consumed by the recording head, ink is supplied from the liquid chamber 36 to the negative pressure generating member 32 in the negative pressure generating member containing chamber 34 via the communication hole 40 of the partition 38, as shown in FIGS. 6A and 6B. In this case, the pressure in the liquid chamber 36 is reduced, whereas air taken from the atmospheric air communicating portion 12 via the negative pressure generating member containing chamber 34 enters the liquid chamber 36 through the communication hole 40 of the partition 38 (a state shown in FIG. 6B), thereby easing the pressure reduction in the liquid chamber 36. Therefore, even when ink is consumed by the recording head, ink from the liquid chamber 36 is filled into the negative pressure generating member 32 in accordance with the amount of consumption, and the negative pressure generating member 32 holds a constant amount of ink and maintains a substantially constant negative pressure with respect to the recording head. This stabilizes the supply of ink to the recording head.

Hitherto, a urethane foam has been often used as the above-described negative pressure generating member. The assignee of this application has proposed an ink tank in which a thermoplastic fiber material made of olefin resin is used as an absorber.

The fiber absorber is superior in ink wettability and utilization efficiency. The capillary force of the fiber absorber can be easily and arbitrarily set by changing fiber distance, fiber diameter, and the like.

For example, such a fiber may be thermoformed for use in the ink tank. Thermoforming permits fibers to be easily handled and to be easily inserted into the ink tank.

By thermoforming fiber packed in a die made of aluminum or the like, a fiber absorber of a required size can be formed. However, when heat is applied to the die having fiber therein, fiber is sometimes crushed down in the direction of gravity, depending on the conditions such as fiber density and dimensions. This seems to be because fiber having impact resilience is contained in close contact with the inside of the die before heating, whereas the impact resilience is reduced by melting of the contact portion of the fiber and a decrease in elasticity (a decrease in spring constant) of a base portion of the fiber with a temperature increase when heat is applied to the fiber, and the fiber is crushed by its own weight due to gravity.

FIGS. 7A, 7B, and 7C show a case in which a fibrous material laminate 1, constructed by a web stacked block (fibrous material stacked block) formed by stacking a plurality of webs (fibrous materials) with fibers oriented in almost the same direction, is inserted into an aluminum die in order to obtain a fiber laminate.

The fibers are oriented in a predetermined fiber direction "a" and are stacked in a stacking direction "b" orthogonal to the fiber direction "a", as shown in FIG. 7A. The fibrous material laminate 1 is compressed in the stacking direction and packed in a die 2, and a cover 3 is put on the die 2, as shown in FIGS. 7B and 7C.

FIGS. 8A and 8B show a state in which the fibrous material laminate 1 packed in the die 2 is worked by an example of a thermoforming method.

In this example, when heat begins to be applied from an initial state in which the fibrous material laminate 1 is packed in the entirety of the die 2, the fibrous material laminate 1 is gradually crushed from its peripheral portion in the direction of gravity, as shown in FIG. 8A. This is because heat is conducted from the periphery of the die 2, and the influence of heat first acts on the peripheral portion of the fibrous material laminate 1. When further heat is applied, heat is conducted to the interior of the fibrous material laminate 1, as shown in FIG. 8B, and the entire bottom side of the fibrous material laminate 1 is crushed. In this case, since its own weight is laid on the fibrous material laminate 1, the density of the fibrous material laminate 1 differs between the upper part and the lower part in the direction of gravity. That is, the lower part of the fibrous material laminate 1, which is more strongly influenced by its own weight, has a high density, and the upper part has a low density, which produces a density gradient. While FIG. 8B shows two density areas of the fibrous material laminate 1, a low-density area and a high-density area, for simple illustration, in reality, the density gradient is continuously formed from the low-density area to the high-density area.

A product obtained by such thermoforming is referred to as a "fiber laminate". In the fiber laminate, a density distribution differs between the upper part and the lower part, and a desired fiber density and a desired fiber size cannot be obtained. In a case in which the fiber laminate which has been removed from the die is cut into a desired size and the cut pieces are placed into ink tank housings so as to form ink tanks, the fiber density distribution varies among the cut pieces. Furthermore, it is substantially difficult to verify the differences in density distribution among the pieces in the cut state. As a result, one tank may have a high-density area on its bottom side in an operational state, and another tank may have a low-density area on its bottom side. This may cause undesirable retention and shortage of ink.

From a production viewpoint, it is not practical to thoroughly manage the processes from a thermoforming process for a fibrous material laminate to cut and insertion processes in order to avoid the above circumstances.

In particular, when the above-described fiber laminate is used as a negative pressure generating member in a combination ink tank having both a negative pressure generating member containing chamber and a liquid chamber, there is a fear that desired stability of ink supply will not be obtained.

For example, FIG. 9 is a schematic view showing a state that may be produced when a fiber laminate having a significantly nonuniform density is used as an ink absorber inside an ink tank, immediately before ink runs short inside the fiber laminate before a gas-liquid exchange operation. That is, fiber density is low in an area between a communication hole 40 and an ink supply port 14, and capillary force is insufficient. Therefore, ink does not lie in some sections. If ink supply is further continued from this state, ink in the liquid chamber and ink in an area communicating with the liquid chamber are not supplied, and ink supply is stopped at the time when ink in the fiber laminate at the supply port is entirely consumed, although ink still remains in the liquid chamber.

Such ink supply failure occurs not only in the ink tank having a configuration shown in FIG. 9, but also in ink tanks having no liquid chamber.

When thermoformed olefin fiber is used, the difference between the thermoforming temperature and the fiber melting point is very small and the influence of softening is great, in comparison with thermoforming of polyester fiber.

SUMMARY OF THE INVENTION

The present invention has been made to overcome the above problems, and it is an object of the present invention to provide a method of producing a fiber laminate in which a fiber laminate is prevented from being undesirably crushed downward in the direction of gravity during thermoforming, and in which the fiber laminate has a desired size, a desired fiber density state, and high ink wettability; a fiber laminate produced by the method; a liquid reservoir containing the fiber laminate and for stably supplying ink; and a liquid-jetting head cartridge having the liquid reservoir.

According to one aspect of the present invention, there is provided a fiber laminate production method in which fibrous materials oriented in almost the same direction are stacked and thermoformed, the production method including a step of controlling the influence of gravity on a laminate of the fibrous materials during thermoforming.

According to another aspect of the present invention, there is provided a fiber laminate produced by the above production method.

According to a further aspect of the present invention, there is provided a liquid reservoir for containing the fiber laminate produced by the method, and for holding liquid to be used in recording.

According to a further aspect of the present invention, there is provided a liquid-jetting head cartridge including the liquid reservoir, and a liquid-jetting head for jetting the liquid contained in the liquid reservoir.

By using the above production method, only a surface or a part of the heated fiber does not move down in the direction of gravity, and the fiber absorber is not likely to be influenced by gravity. Therefore, fiber is prevented from being crushed due to its own weight.

When the liquid reservoir or the liquid-jet head cartridge is constituted by the fiber absorber produced by the method in which only a part is not undesirably densified due to gravity, it is possible to reduce the amount of ink remaining in the reservoir and to stabilize ink supply performance.

Further objects, features, and advantages of the present invention will become apparent from the following description of the preferred embodiments with reference to the attached drawings.

BRIEF DESCRIPTION OF THE DRAWINGS

FIGS. 5A to 5E are schematic perspective views showing further embodiments of the present invention;

DESCRIPTION OF THE PREFERRED EMBODIMENTS

Embodiments of the present invention will be described below in detail with reference to the attached drawings.

First, description will be given of the structure of fibers used in the embodiments of the present invention.

Figure 10:
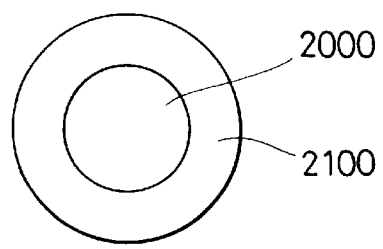
FIG. 10 is a schematic structural view of a biaxial fiber.

FIG. 10 is a cross-sectional view of a fiber used in the embodiments described below. In the embodiments, a core-and-sheath fiber is used which has a compound structure including a core portion 2000 made of polypropylene (hereinafter abbreviated as "PP") and a peripheral sheath portion 2100 made of polyethylene (hereinafter abbreviated as "PE"). The melting points of the PP 2000 and the PE 2100 are approximately 180° C. and 130° C., respectively.

Considering that the fiber is to be retained inside an ink tank, a preferable fiber diameter is within a range of approximately $5\mu$ to $50\mu$.

A fibrous material laminate 1 will be described below. The fibrous material laminate 1 is composed of the above-described compound-structure fibers, and is formed by stacking webs (fibrous materials) made by a carding machine or the like. The webs can be easily stacked by a commercial web-stacking machine, such as a cloth layering machine, and a desired fibrous material laminate 1 can be also obtained by several methods that will be described below. In the following description, fibrous material laminates are sometimes divided into web-stacked blocks (fibrous material stacked blocks) formed by working stacked webs into a block, and web laminates (fibrous material laminates) formed by continuously working stacked webs. These materials are worked into finished products, which are referred to as "fiber laminates".

Figure 1:
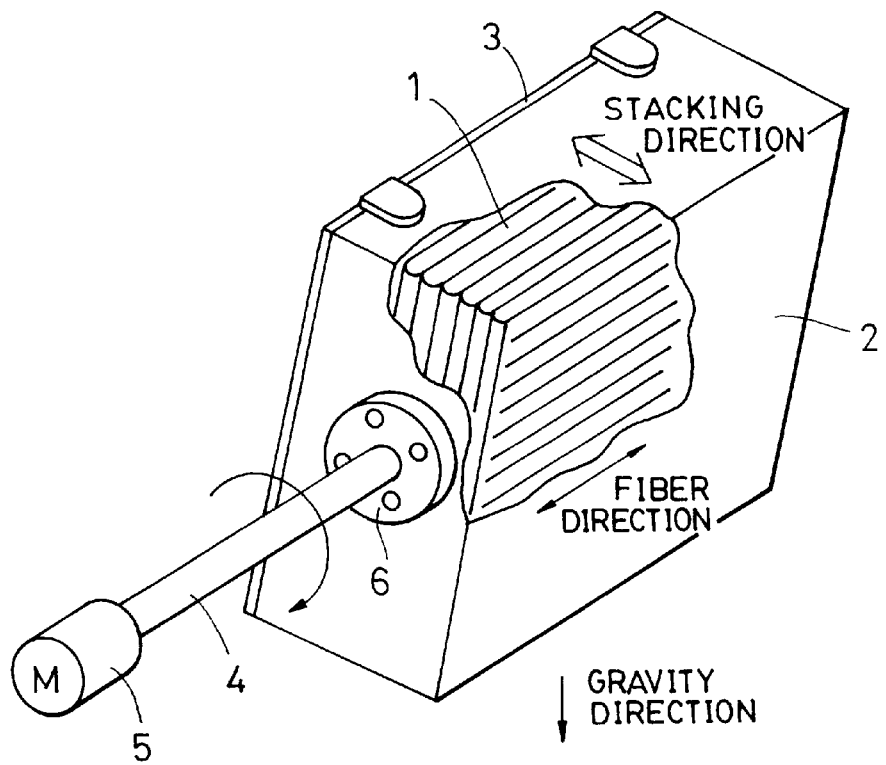
FIG. 1 is a schematic perspective view showing an embodiment of the present invention.

FIG. 1 is a perspective view illustrating an embodiment of the present invention. As shown in FIG. 1, a rotation shaft 4 to be rotated by a motor 5 is mounted on a side face of a forming die 2 through a mounting jig 6, and the forming die 2 is rotated during a heating process. In this case, the rotation shaft 4 is placed to extend in a direction orthogonal to the direction of gravity.

While the weight of the laminate always acts downwardly in the direction of gravity in a fixed state, the direction of action of the weight can always be changed by rotating the forming die 2 in such a manner in which the influence of gravity is canceled. This makes it possible to prevent a fibrous material laminate (web-stacked block) from being crushed only in one direction, and to obtain a fiber laminate having an isotropically well-balanced density and the same dimensions as defined by the forming die 2.

In the embodiment shown in FIG. 1, the rotation shaft 4 is mounted at about the center of the side face of the forming die 2, and is placed orthogonal to the direction of gravity. The fibrous material laminate is placed in the forming die 2 so that fibrous materials (webs) are stacked in a direction orthogonal to the axial direction of the rotation shaft 4 with the fiber direction aligned with the axial direction of the rotation shaft 4.

By doing this, gravity does not significantly act in the stacking direction, which would likely to be influenced by gravity, because of rotation, and an undesirable density distribution is avoided.

A desired fiber laminate can be obtained by starting the rotation of the rotation shaft 4 at a time when the fiber material is heated to a softening initiation temperature. It is more preferable to continue the rotation until the influence of residual heat ceases, or even during cooling, than to terminate the rotation at the completion of heating.

When the rotation rate of the rotation shaft 4 is too low, the fibrous material laminate in the forming die 2 is influenced by gravity, and an object of the present invention is not achieved. In contrast, when the rotation rate is too high, the fibrous material laminate is affected by centrifugal forces, and the density of the peripheral portion of the fibrous material laminate may increase. Therefore, the rotation rate is appropriately determined so as to avoid such circumstances. Furthermore, the object can be achieved by continuous rotation or intermittent rotation.

Figure 2:
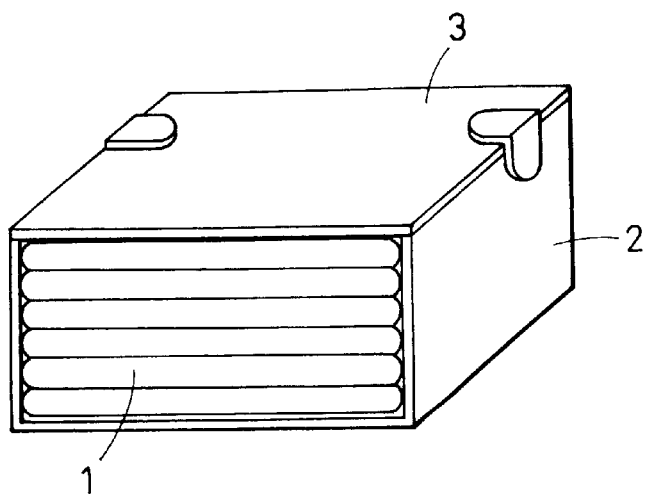
FIG. 2 is a schematic view showing the state of a fiber absorber worked by the structure shown in FIG. 1, in which a die is partially cut away.

In the embodiment shown in FIG. 1, the rotation shaft 4 is rotated at 1 rpm, so that a fiber laminate is obtained which is subjected to well-balanced thermoforming without being influenced by gravity, and which has a dense distribution which does not substantially influence ink supply, as shown in FIG. 2.

The fibers used in this embodiment have a fineness of 0.5 deniers to 10 deniers, and a density of 0.01 $g/cm^3$ to 0.3 $g/cm^3$.

Figure 3:
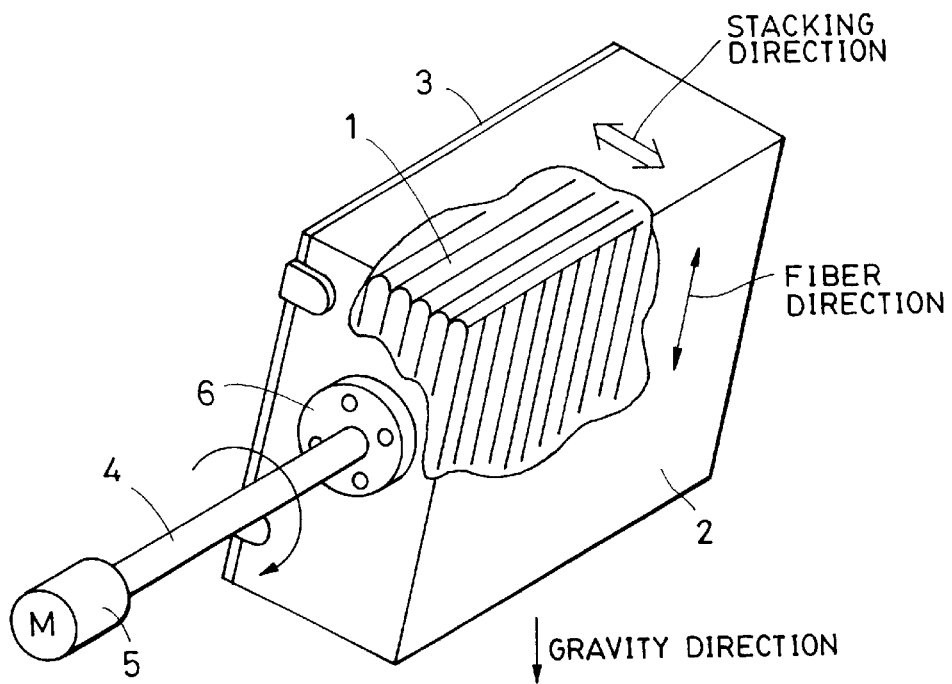
FIG. 3 is a schematic perspective view showing another embodiment of the present invention.

FIG. 3 shows another embodiment of the present invention. This embodiment is similar to the embodiment shown in FIG. 1 except that a fibrous material laminate 1 is placed inside a forming die 2 so that the fiber direction is orthogonal to the axial direction of a rotation shaft 4.

This structure also allows a fiber laminate subjected to well-balanced thermoforming without any influence of gravity.

Figure 4:
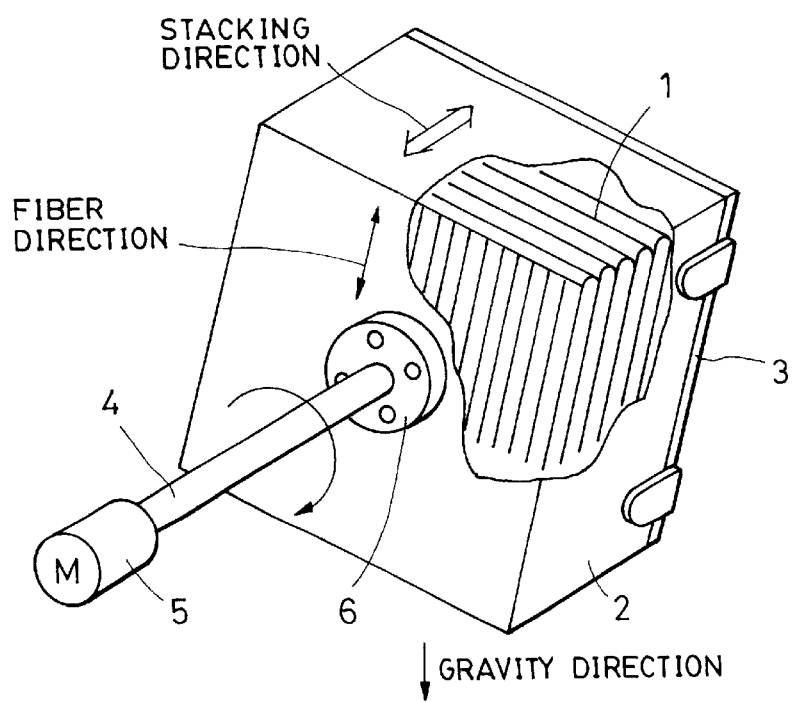
FIG. 4 is a schematic perspective view showing a further embodiment of the present invention.
Figure 6A:
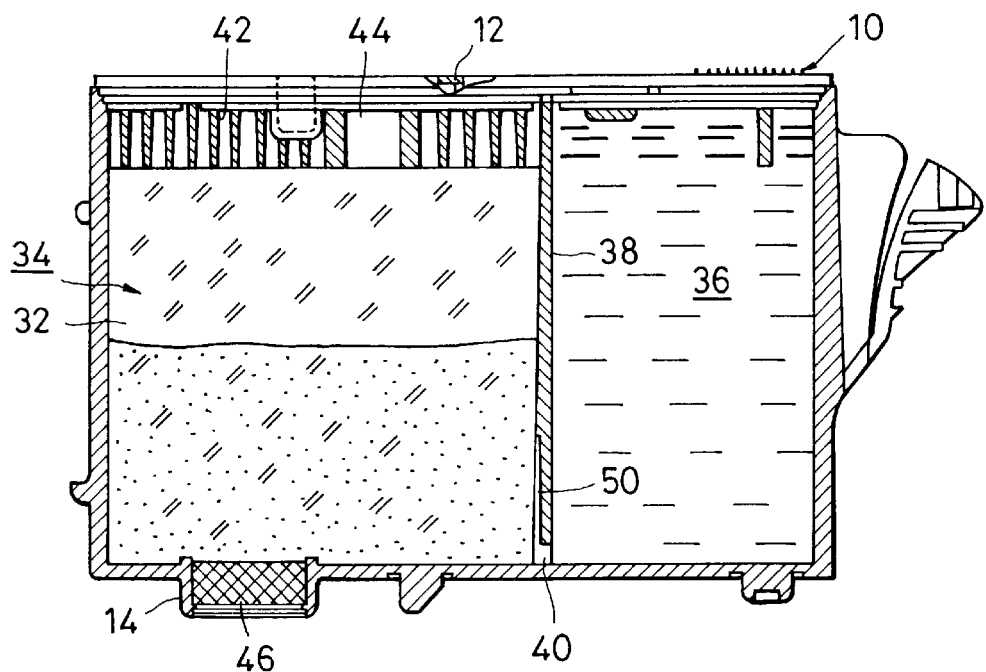
FIGS. 6A and 6B are cross-sectional views showing the general configuration of a combination ink tank.
Figure 6B:
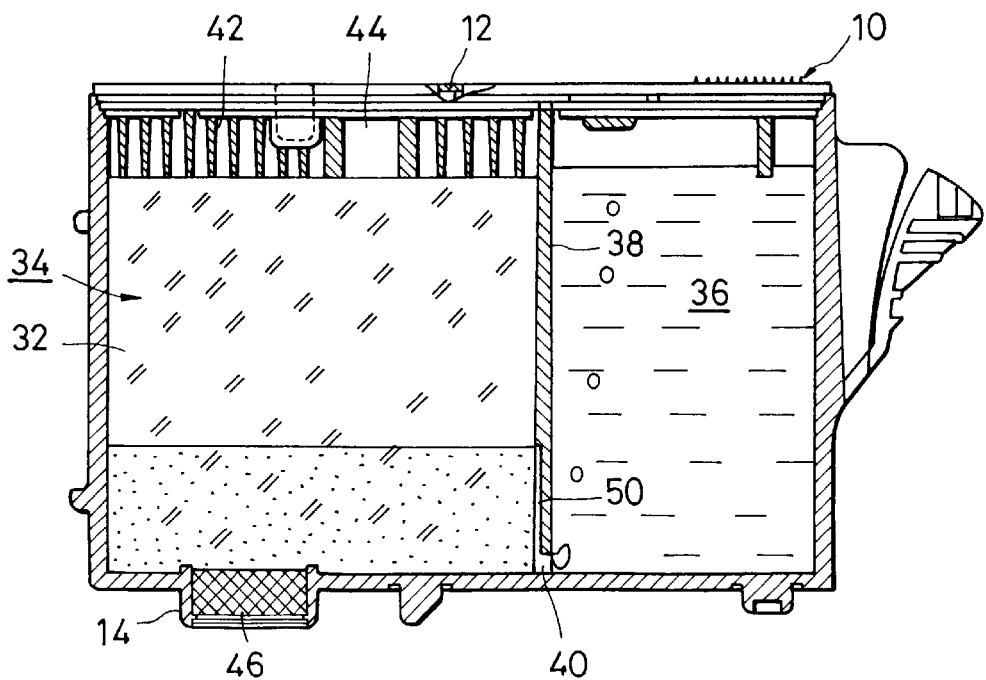
Figures 7A, 7B, 7C:
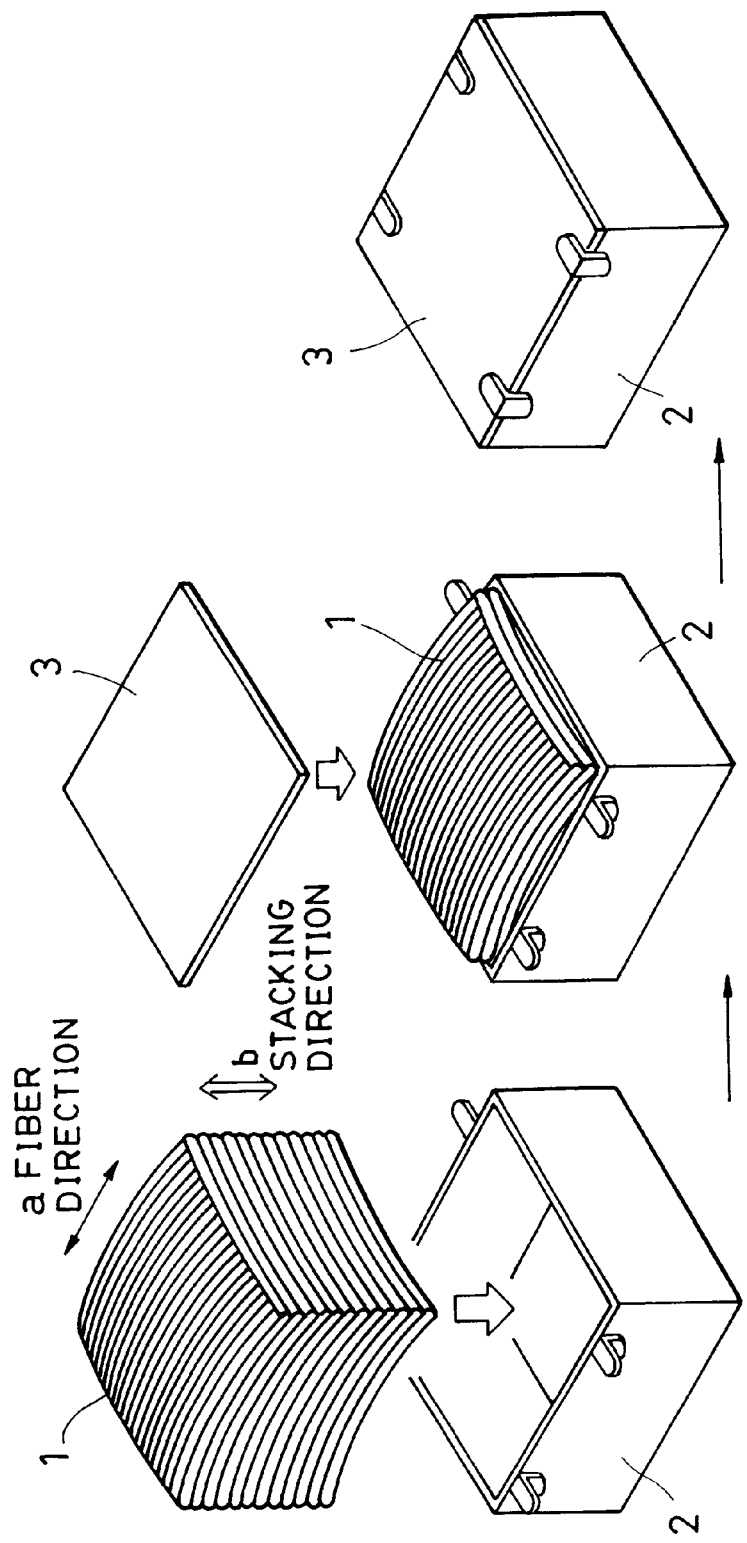
FIGS. 7A to 7C are explanatory views showing sequential steps of packing a fiber material into a die.
Figure 8A:
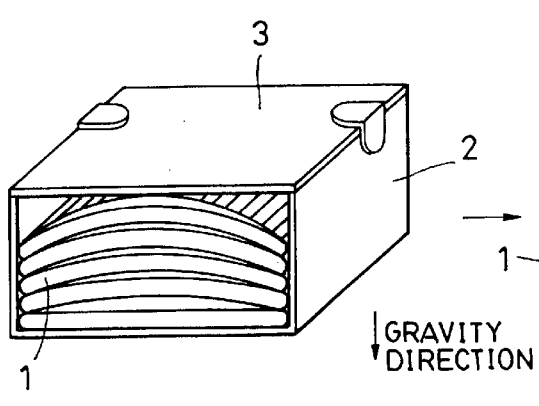
FIGS. 8A and 8B are cross-sectional views of a fiber material thermoformed by a conventional method.
Figure 8B:
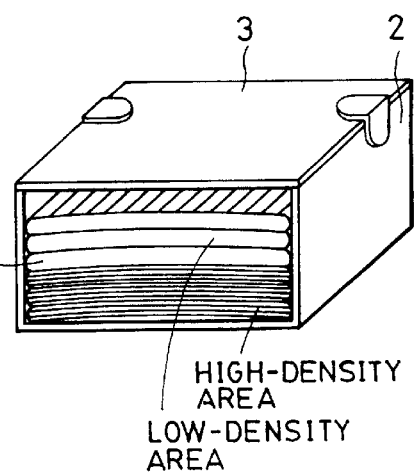
Figure 9:
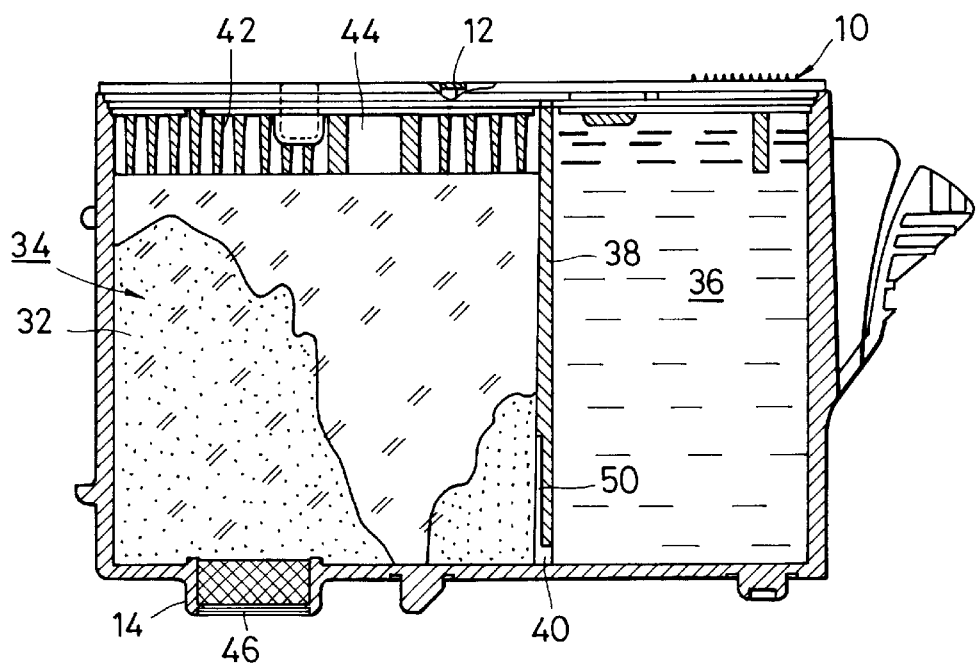
FIG. 9 is a schematic sectional view of the ink tank in which ink runs short.

FIG. 4 shows a further embodiment of the present invention, in which the fiber direction is orthogonal to the axial direction of the rotation shaft and the stacking direction is parallel to the axial direction of the rotation shaft. This direction setting is preferable when impact resilience in the stacking direction is rather low.

As described above, impact resilience of the material forming the fibers varies in direction depending on conditions, such as the type and density of the fiber material, the lengths of sides, and the fiber diameter. When a direction in which impact resilience is small is parallel to the rotation axis direction and is orthogonal to the direction of gravity, it is possible to reduce the influence of gravity and to obtain a desired fiber laminate having a controlled density distribution and the like.

The die may also be rotated in the manners shown in FIGS. 5A to 5E.

FIGS. 5A and 5B show cases in which the mounting position of the rotation shaft 4 is offset from the center of the side face, for example, in the structure shown in FIG. 1. FIG. 5A shows a structure in which the mounting position is shifted to one side edge, and FIG. 5B shows a structure in which the mounting position is slightly offset from the center position toward the side edge. By performing rotations of such structures, it is also possible to obtain a fiber laminate having a uniform density. In consideration of centrifugal force resulting from rotations, it is preferable to place the rotation shaft at the center of the die.

As shown in FIG. 5C, the die may be turned so as to draw a large circle. Furthermore, a plurality of dies may be placed on a large turning circle in order to improve production capacity, as shown in FIG. 5D.

Furthermore, the die may be turned in a spiral manner, as shown in FIG. 5E.

While a fiber laminate can be obtained in an isotropic state by using the rotations, as described above, a desired density distribution can be imparted to the obtained fiber laminate by changing the rotation conditions. In this case, when the relationships among heating temperature, heating period, and changes in the fiber absorber due to heating are known in advance, it is possible to produce a fiber laminate having a desired density distribution with dense portions and coarse portions controlled.

Description will be given below of another method of producing a fiber laminate which has a more uniform fiber density and does not have a dense and coarse distribution.

Figure 11:
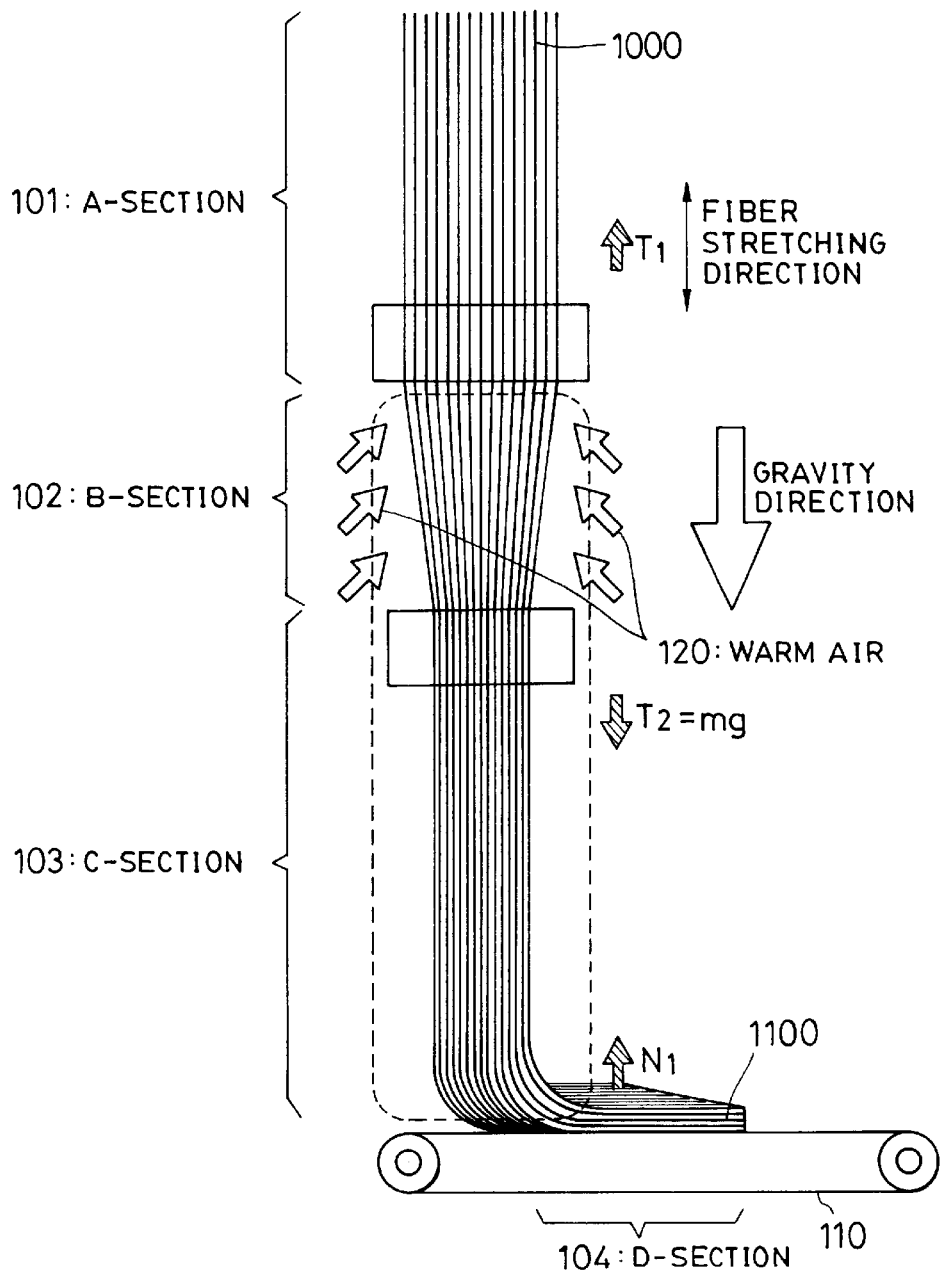
FIG. 11 is a schematic view showing another embodiment to which the present invention is applied.

FIG. 11 is a schematic side view showing another embodiment of the present invention. A fibrous material laminate 1000 (a web laminate (fibrous material laminate) to be continuously worked in this embodiment) formed by stacking a plurality of fibrous materials (webs) is supplied from the top side along the direction of gravity (A-section 101). The fibrous material laminate 1000, which is bundled at a desired density by being heated by warm air in a B-section 102, is cooled through a C-section 103, and is transported as a fiber laminate 1100 having no substantial density distribution by a horizontal conveyor 110.

By thus hanging the fibrous material laminate 1000 in the direction of gravity, gravity acts on the fibers only in the fiber stretching direction. Therefore, an unequal distribution is not substantially produced in the stacking of the fibrous materials (webs).

An upward tension T1 and a downward force mg act on the fibrous material laminate 1000 supplied from above in such a method. When a new fibrous material laminate 1000 is supplied from above, a fiber laminate 1100 having the same weight as that of the supplied fibrous material laminate 1000 is fed to the conveyor 110. Since the weight of the fiber laminate 1100 in the D-section 104 is offset by a vertical resistance N1 from the conveyor 110, it is possible to neglect the influence on the tension of the fibrous material laminate 1000 from the A-section 101 to the C-section 103. Since the weight of the fibrous material laminate 1000 from the A-section to the C-section is constant, with no regard to variations in weight per unit length, it is possible to negate variations due to the influence of gravity in the fiber stretching direction.

In the embodiment shown in FIG. 11, warm air in the B-section 102 is blown against the fibrous material laminate 1000 from the right and left sides in an upward direction. While the temperature of the fibrous material laminate 1000 is highest adjacent to the center thereof where warm air from the right side and warm air from the left side meet, since the peripheral portion of the fibrous material laminate 1000 is collected toward the center by warm air, fibers are bundled as a whole, the fiber distance decreases, and the temperature of the peripheral fiber portion increases. As a result, the temperature of the entire fibrous material laminate 1000 is made uniform.

Since the approximate center of the fiber bundle serves as a path through which warm air blown from below flows upward between fibers, when the fibrous material laminate 1000 is collected to some extent, the fiber distance is prevented from being excessively decreased. Because of both the movement of air and the stacking of the fibrous materials without any influence of gravity, the heated fiber laminate 1100 can be substantially prevented from being influenced by gravity. This allows the fiber laminate to have a substantially uniform density distribution.

While the fibrous material laminate 1000 is supplied from top to bottom parallel to gravity in this embodiment, it may conversely be pulled upward from bottom to top so as to form a fiber laminate. This can also provide a method of producing a fiber laminate that has a uniform density distribution in the fiber stacking direction and that achieves substantially uniform ink supply. In this case, the structure shown in FIG. 11 is inverted.

While the above-described production method aims to positively avoid a density distribution in the fiber stacking direction, for example, a fiber laminate having a desired density distribution can be provided, for example, by positively forming an uneven bundled state in the process from the B-section 102 to the C-section 103 in FIG. 11.

Another production method to which the present invention may be applied will be described below.

Figure 12:
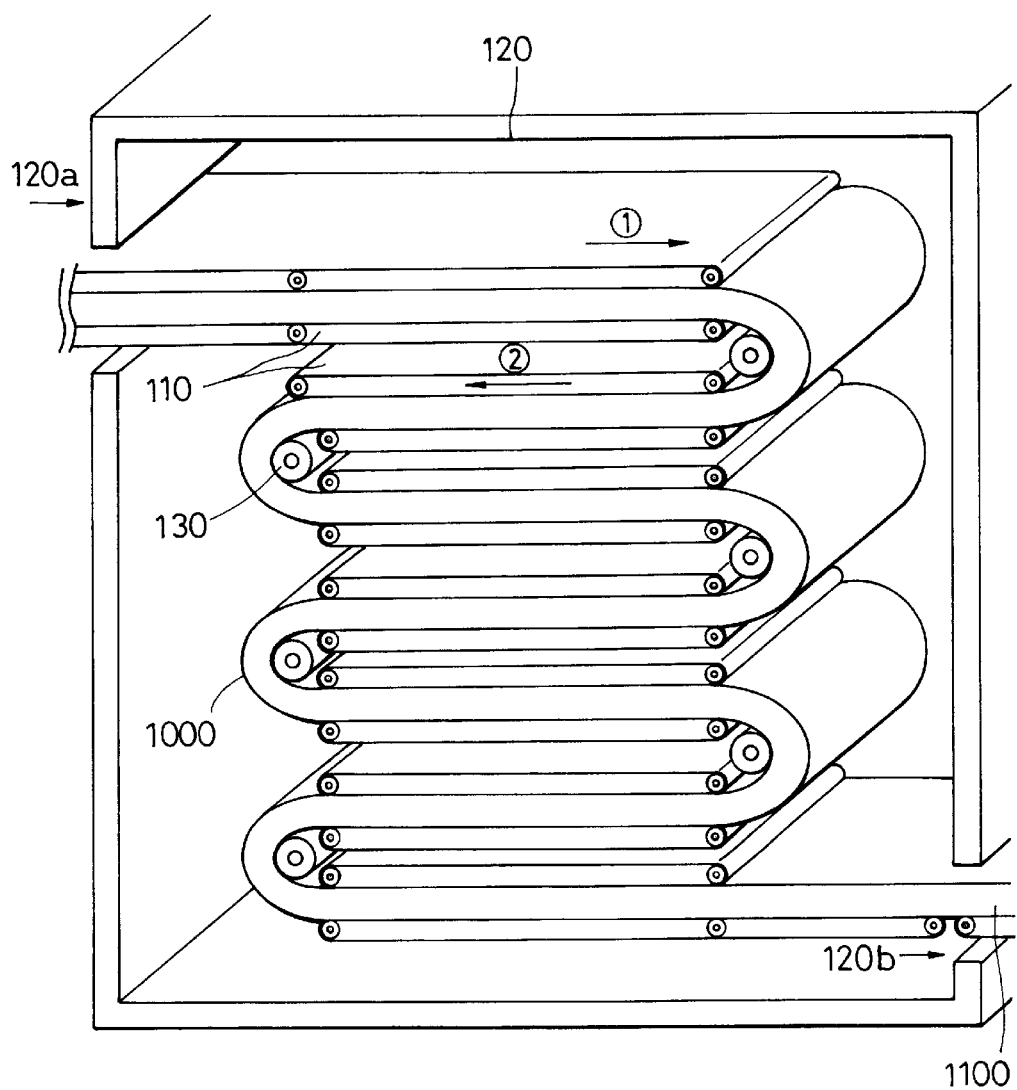
FIG. 12 is a schematic view showing a further embodiment to which the present invention is applied.

FIG. 12 is a perspective view, illustrating a further embodiment of the present invention, showing a heating process for forming a fiber laminate 1100.

As shown in FIG. 12, a fibrous material laminate 1000 (a web laminate (fibrous material laminate) to be continuously worked in this embodiment) is fed into a heating furnace 120 from an input port 120*a*. In this embodiment, the fibrous material laminate 1000 is conveyed by belt conveyors 110. Because of the use in the heating furnace 120, the belt conveyors 110 must be heat-resistant and must, of course, withstand the heating temperature. The fibrous material laminate 1000 fed into the heating furnace 120 travels horizontally, and is turned upside down at a predetermined position. This turning operation is repeated a plurality of times, as shown in FIG. 12.

Description will be given of a hypothetical case in which the fibrous laminate 1100 is obtained by heating without repeating such a turning operation. Before being put into the heating furnace 120, the fibrous material laminate 1000 is acted on by its own weight downwardly in the direction of gravity, but it has impact resilience. When the fibrous material laminate 1000 is put into the heating furnace 120 and is heated, fibers soften and the impact resilience decreases. As a result, the fibers are crushed due to gravity, and the density increases toward the bottom of the fibrous material laminate 1000 due to its own weight. Ultimately, it is impossible to obtain a fiber laminate having a uniform density.

In a case in which the fibrous material laminate 1000 is heated while being inverted as in this embodiment, for example, a lower surface of the fibrous material laminate 1000 traveling in a direction of the arrow ① of FIG. 12 is turned and placed on the upper side when traveling in a direction of the arrow ②. As a result, both the upper and lower surfaces are equally influenced by gravity in turn.

The fibrous material laminate 1000 is discharged from an output port 120b of the heating furnace 120, and is subsequently subjected to cooling and cutting processes, thereby yielding a fiber laminate 1100.

By thus inverting the fibrous material laminate 1000 in the heating process, the influence of gravity is reduced, and a fiber laminate having a uniform density can be obtained.

While the turning operation is performed six times in FIG. 12, the number of times the operation is performed is not limited to six, and may be determined depending on the heating period necessary for the heating process, the traveling speed of the fibrous material laminate 1000, the size of the heating furnace, and the like.

The traveling speed is determined depending on the throughput in the processes before and after the heating process, and the like.

While the vertical distance between the belt conveyors 110 for clamping the fibrous material laminate 1000 is substantially constant in this embodiment, it need not always be constant. For example, the distance between the belt conveyors 110 may be set to be rather wide near the input port 120a of the heating furnace 120, and may decrease toward the output port 120b. By doing this, the fibrous material laminate 1000 is gradually compressed by the belt conveyors 110 as a result, which yields a more uniform fiber laminate.

Figure 13:
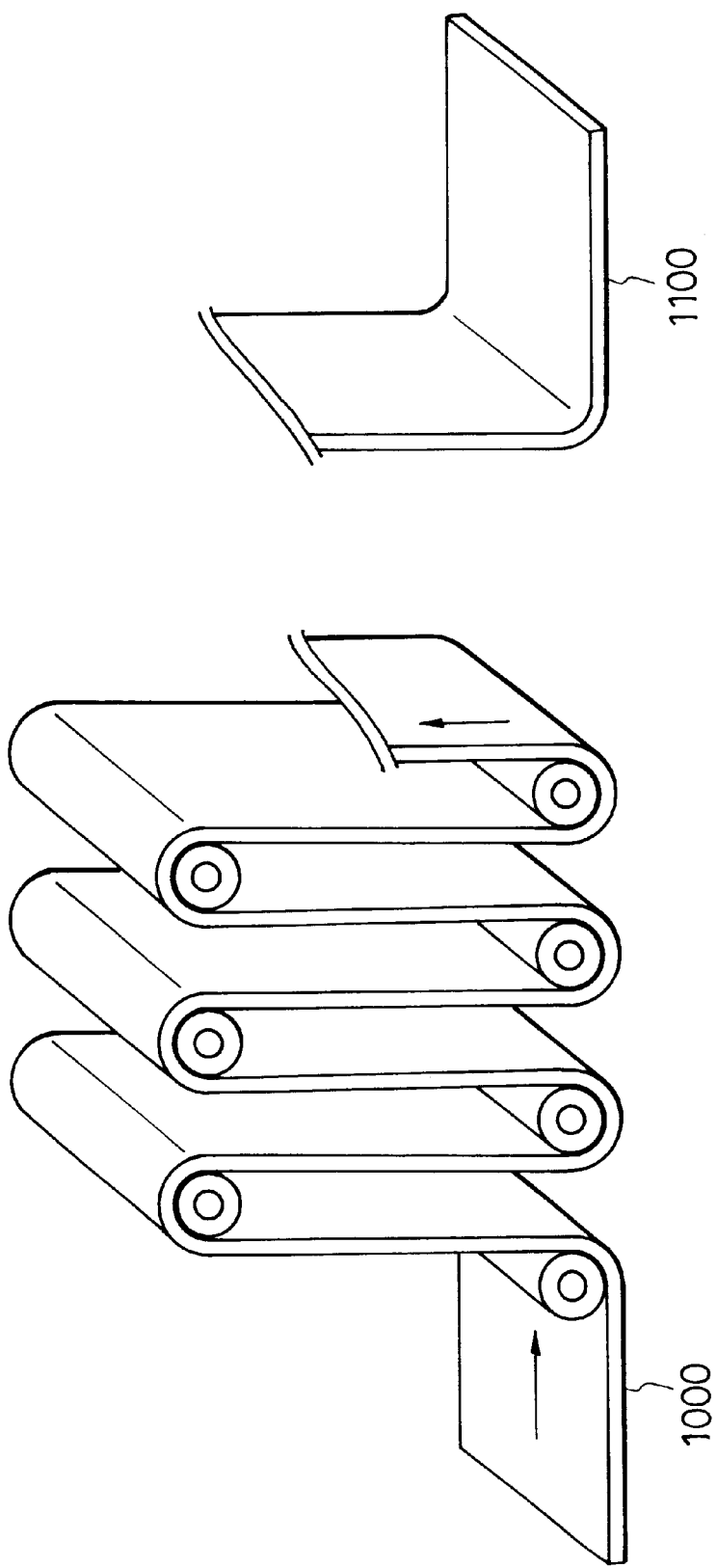
FIG. 13 is a schematic view showing a further embodiment to which the present invention is applied.

A method as shown in FIG. 13 may also be adopted.

The traveling direction of a fibrous material laminate 1000 in FIG. 13 is vertical, which differs from the direction in FIG. 12. When the fibrous material laminate 1000 traveling upward in the vertical direction reaches a predetermined position, it is inverted and vertically travels downward. According to this structure, gravity acts in the fiber stacking direction for a shorter period than in that in the structure shown in FIG. 12. However, since force acts locally on fibers at the inverting positions in the structure shown in FIG. 13, it is necessary to take the conveyance speed and the like into consideration. The local force can be reduced by making the inverting structure gentler.

Both the methods illustrated in FIGS. 12 and 13 allow production of a fiber laminate having a uniform density.

By adjusting the path length (timing of inversion) shown in FIGS. 12 and 13, it is possible to change the period in which gravity acts on the fibrous material laminate 1000, and to adjust the density distribution of the fiber laminate 1100.

The method illustrated shown in FIG. 12 or the method illustrated shown in FIG. 13 may be selected according to the production space for fiber laminates, and the like.

Figure 14:
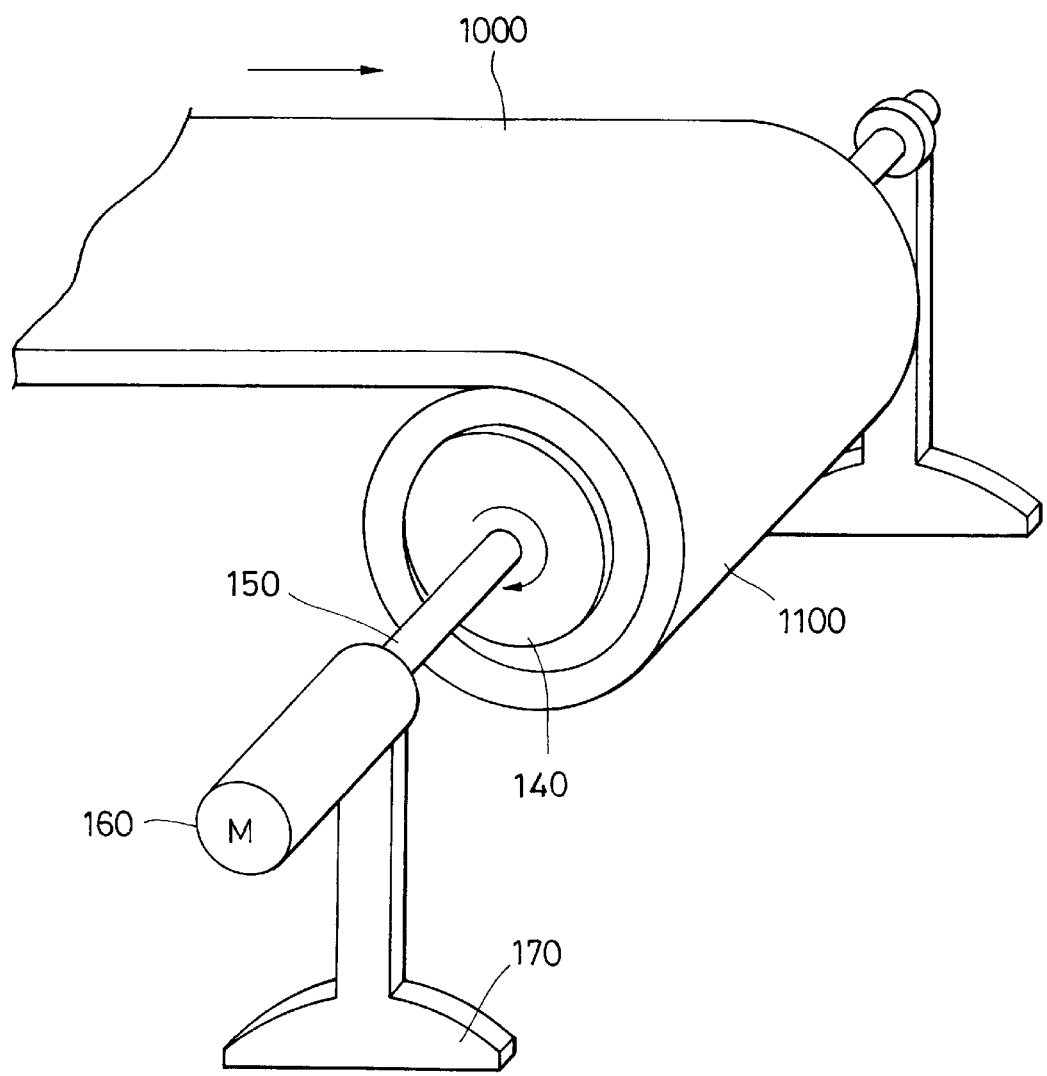
FIG. 14 is a schematic view showing a further embodiment to which the present invention is applied.

FIG. 14 is a perspective view showing another method.

As shown in FIG. 14, a fibrous material laminate 1000, which is fed from the left side, is wound on a drum 140 rotated by a motor 160. A rotation shaft 150 extending at the center of the drum 140 is supported by supports 170. The fibrous material laminate 1000 is being heated by a heating furnace (not shown).

By thus stacking the fibrous material laminate 1000 while winding it on the rotating drum 140, it is possible to prevent the crushing and nonuniform density of a fiber laminate 1100 due to force acting downwardly in the direction of gravity during production, in a manner similar to the method shown in FIG. 1.

While the entire device can be placed into the heating furnace shown in FIG. 12, the rotation shaft 150 may be aligned with holes formed in the heating furnace, and the supports 170 and the like may be placed outside the heating furnace. This allows the space in the heating furnace to be effectively used.

In this embodiment, when a desired thickness is obtained, the supply of the fibrous material laminate 1000 and heating are stopped to shift to a cooling process (including natural heat radiation and forced cooling). In this case, the rotation is continued until fibers are cooled so as not to be influenced by gravity. When a desired cooling state is achieved, a fiber laminate 1100 is obtained. The fiber laminate 1100 is cut out and is removed off the drum 140.

The fibrous material laminate 1000 may be wound not only in the heating process, but also in other states in which heating is not performed. The fibrous material laminate 1000 may be wound before the heating process, and may be brought into the heating process in a wound state. In this case, it is preferable to rotate the drum during the heating process, which provides advantages similar to those in the embodiment shown in FIG. 1. The winding end of the fibrous material laminate 1000 is handled so as not to hang down (for example, a cover is put thereon).

By drawing the fiber laminate 1100 from the drum 140 without cutting it, a hollow cylindrical fiber laminate can be obtained.

The fibrous material laminate may be heated from the inside of the drum. Since heat is continuously applied to the inner fibers, this seems to be effective in obtaining a fiber laminate including a high-density portion close to the drum and a low-density portion apart from the drum.

Figure 15A:
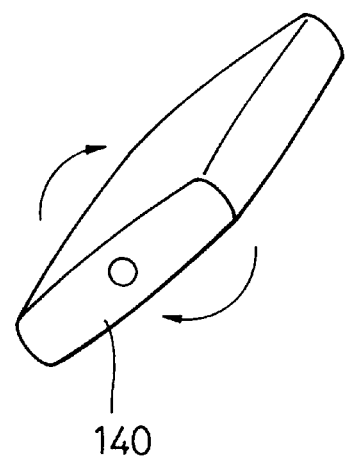
FIGS. 15A and 15B are schematic views showing modifications of the device shown in FIG. 14.
Figure 15B:
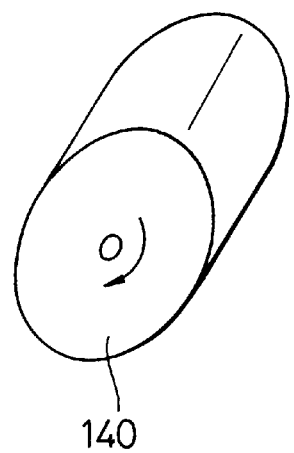

Furthermore, the drum 140 may have long planar portions, as shown in FIG. 15A, or may be elliptical, as shown in FIG. 15B. In particular, the drum 140 shown in FIG. 15A allows a fiber laminate having long planar portions. When a hollow fiber laminate is obtained by being drawn out from the drum without being cut out, as described above, it can be formed in various shapes by using drums having different shapes.

Figure 16:
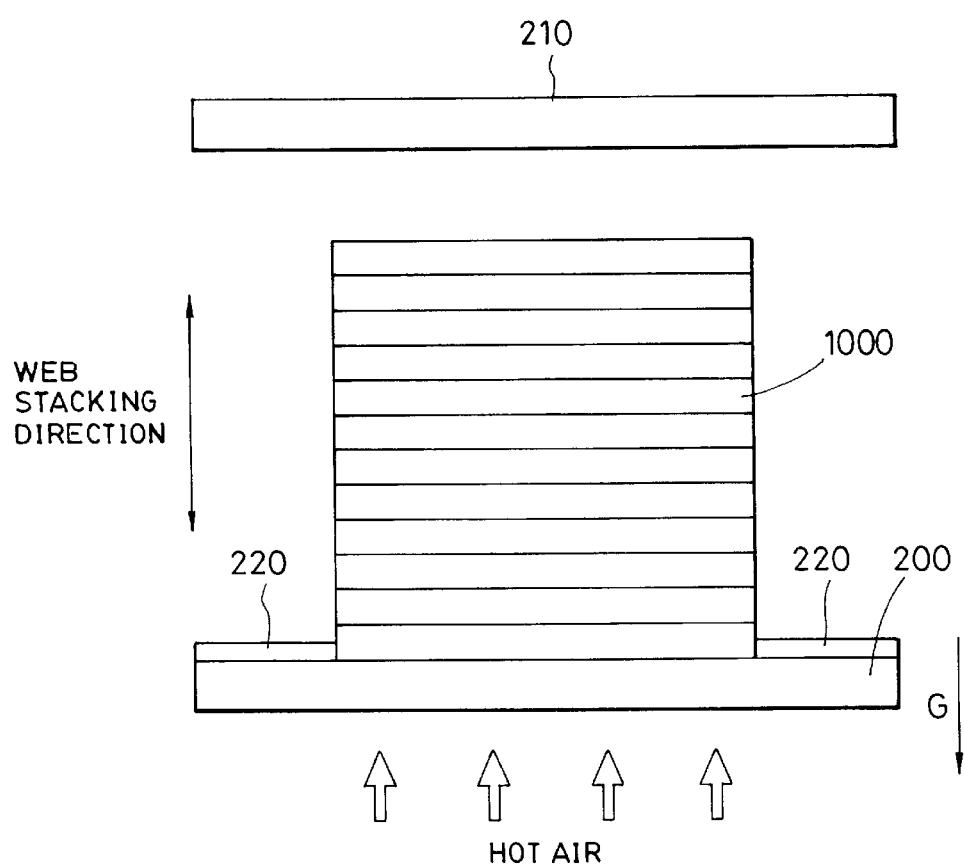
FIG. 16 is a schematic view showing a further embodiment to which the present invention is applied.

FIG. 16 illustrates another fiber laminate production method.

Referring to FIG. 16, a fibrous material laminate 1000 (in this embodiment, a web-stacked block (fibrous material stacked block) is worked) is placed on a punching plate 200 made of stainless steel. Gravity acts in the direction of the arrow G in the figure. Hot air is blown from below into the fibrous material laminate 1000. Thereby, the fibers are levitated, and gravity acting on each fiber is canceled out. Therefore, the entire fibrous material laminate 1000 can be heated while fiber density and fiber direction are properly maintained. The punching plate 200 causes hot air from below to uniformly pass therethrough, and preferably, only a portion thereof on which the fibrous material laminate 1000 is placed passes hot air therethrough. In this embodiment, the portions of the punching plate 200, other than the portion with the fibrous material laminate 1000 thereon, are entirely covered with a stainless steel plate 220.

Figure 17:
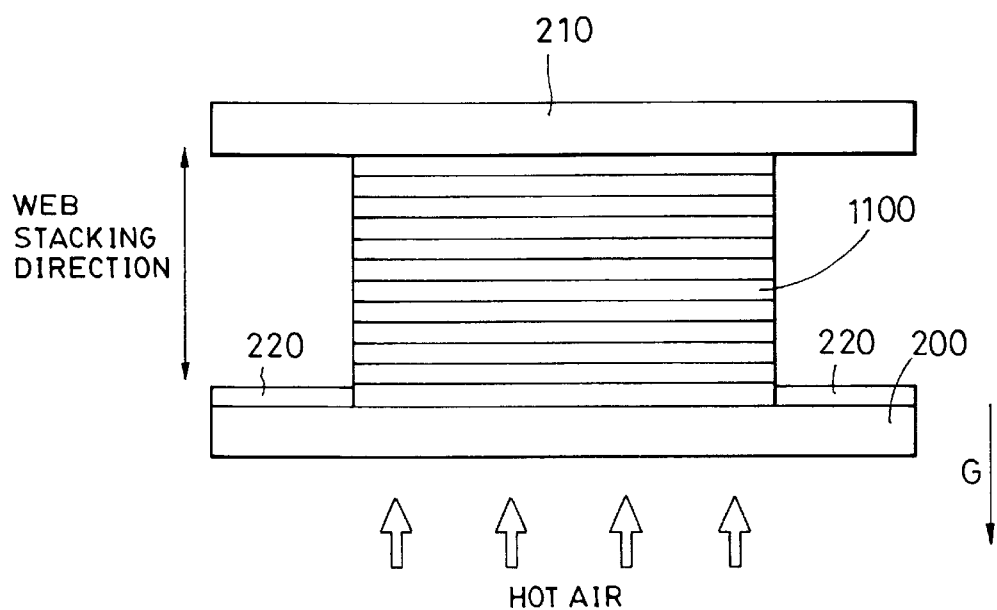
FIG. 17 is a schematic view showing a state in which a fiber laminate is formed in the embodiment shown in FIG. 16.
Figure 18:
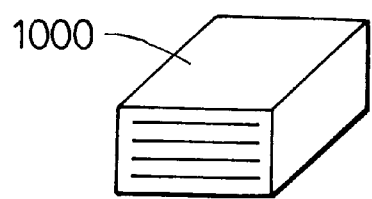
FIG. 18 is a schematic view showing an example of a fibrous material.

In this embodiment, the temperature of hot air is set at 150° C. It is only necessary for the temperature to be lower than the melting point of the PP core portion 2000 and higher than the melting point of the PE sheath portion 2100. After the entire fibrous material laminate 1000 is heated, as shown in FIG. 17, it is compressed by an upper punch 210 to a desired thickness (density), thereby yielding a desired fiber laminate 1100. In this case, it is preferable that the upper punch 210 be heated to almost the same temperature as that of the fibrous material laminate 1000. If the temperature of the upper punch 210 is lower than the melting point of the PE 2100 serving as an adhesive, the PE 2100 hardens from a portion contacted with the upper punch 210 at compression, fibers are melted and adhere to each other, and fiber density of the upper part increases locally. Since the fibrous material laminate 1000 is compressed while gravity acting on the fibers is cancelled by continuously blowing hot air, it is possible to obtain a fiber laminate 1100 that is completely even. While the upper punch 210 may be of any type having high air permeability and high heat conductivity, a punching plate made of stainless steel is used in this embodiment. With compression of the fibrous material laminate 1000, fiber density gradually increases, and air permeability and heat conductivity deteriorate. When fiber density increases, air permeability and heat conductivity deteriorate, and the entire fibrous material laminate 1000 is levitated up against the upper punch 210 by hot air, whereby fiber density of the upper part increases locally. Therefore, it is preferable to slightly reduce the amount of hot air at the time of compression. The compression rate (in this embodiment, the speed at which the upper punch 210 is moved down) is not significantly important when obtaining a fiber laminate 1100 having a high fiber density (0.15 g/cm$^3$ or more) after compression, whereas it is preferable to slowly perform compression at a low rate in order to obtain a fibrous material laminate having a low fiber density. If the compression rate is high, the fiber density of the upper side contacted with the upper punch 210 increases before the entire fibrous material laminate 1000 is compressed, and fibers adhere to each other in that state, thereby locally increasing fiber density of the upper part. In this compression process, it is also preferable that the fibrous material laminate 1000 be compressed by the upper punch 210 from above while being raised from below by hot air.

In this embodiment, the fiber density of the fibrous material laminate 1000 is set at approximately 0.02 g/cm$^3$. After compression, a sufficiently uniform fiber laminate 1100 having a fiber density of 0.03 g/cm$^3$ to 0.3 g/cm$^3$ is obtained. By cutting the obtained fiber laminate 1100 to a predetermined size, a fiber absorber to be contained in an ink tank is obtained. In this embodiment, a fiber absorber may be formed by heating and compressing the fibrous material laminate to a shape that conforms to the shape of the ink tank.

It is possible to positively form a coarse and dense distribution by positively adopting the above-described structures that produces the problems.

Next, a further embodiment of the present invention will be described. In a heating process for thermoforming thermobonding fiber, a (quasi)free fall structure is effective as a means for preventing fibers from being undesirably softened and compressed due to their own weight under heat or the weight of fibers placed in the upper part.

This embodiment also adopts a means for achieving compression forming at a desired density while substantially canceling the influence of gravity.

For example, the above-described fiber having a biaxial structure will be described. This means is effective in obtaining a formed product having a uniform density in a heating period of several seconds because the sheath portion serving as a thermobonding component exhibits at least thermobonding characteristics and displays a desired thermobonding strength.

First, a fibrous material laminate 1000 (for example, a web-stacked block (fibrous material stacked block) formed by working a fibrous material laminate, which has been put through a carding machine and a cloth layering machine, into a block having a predetermined size) is sufficiently preheated at a temperature such that the fibrous material laminate 1000 does not exhibit thermobonding characteristics and is not softened and compressed by its own weight.

Figures 19A, 19B:
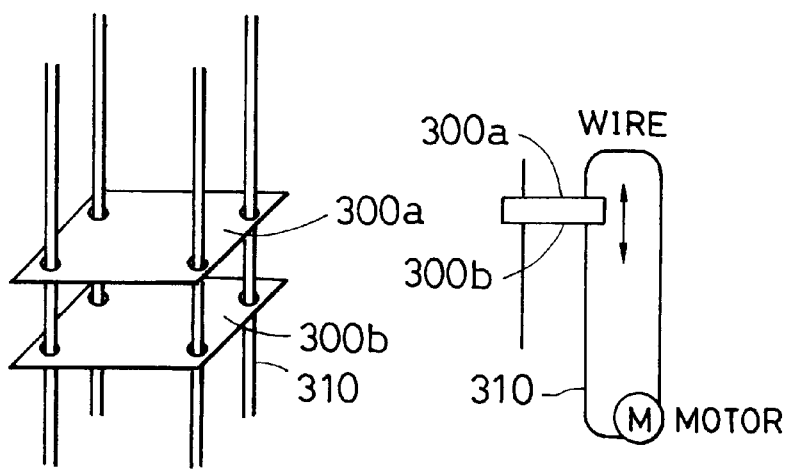
FIGS. 19A and 19B are schematic views of an example of a working device using free fall.

Next, the fibrous material laminate 1000 is promptly clamped by plates 300a and 300b, which conduct heat upward in the vertical direction, to such an extent to which it is not compressed (see FIG. 19A).

Subsequently, a driving system 310 to which the plates 300a and 300b are fixed moves and accelerates downward at a gravitational acceleration of g (see FIG. 19B).

Figure 20:
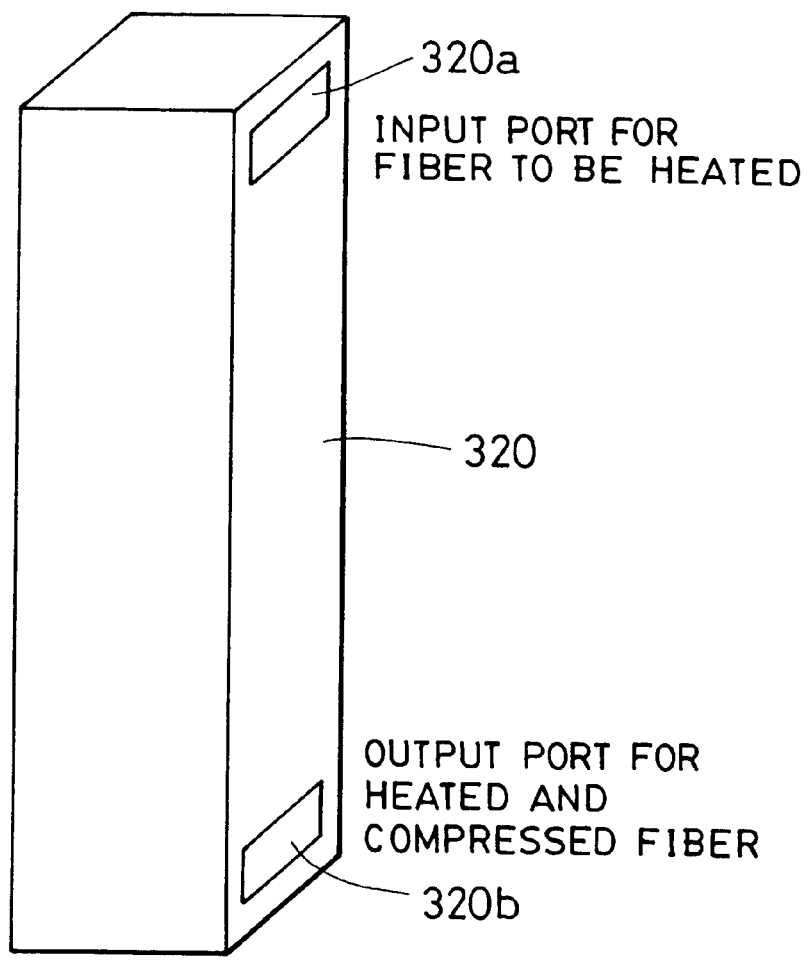
FIG. 20 is a schematic view showing an example of a structure of a heating furnace to which the device shown in FIG. 19 is applied.

In this case, the driving system 310 for the plates 300a and 300b lies in a vertical homogeneous heating furnace 320 (see FIG. 20), and the temperature therein is set at a sufficient temperature to make the sheath material show thermobonding characteristics and not to melt the core material.

Figure 21A:
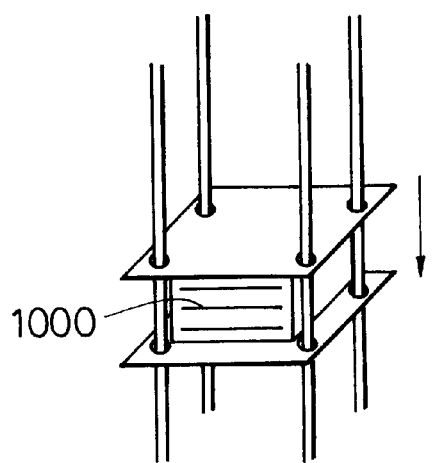
FIGS. 21A and 21B are schematic views showing the heating states using free fall.
Figure 21B:
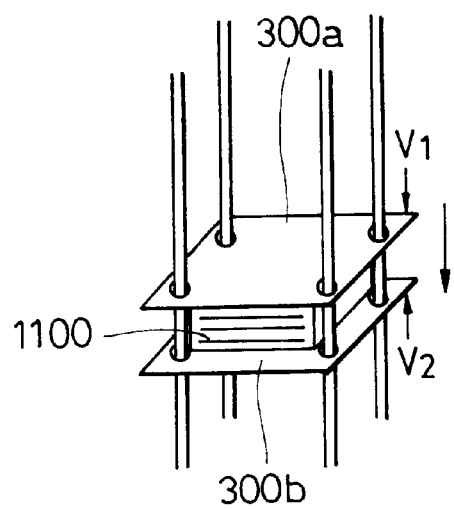
Figure 22:
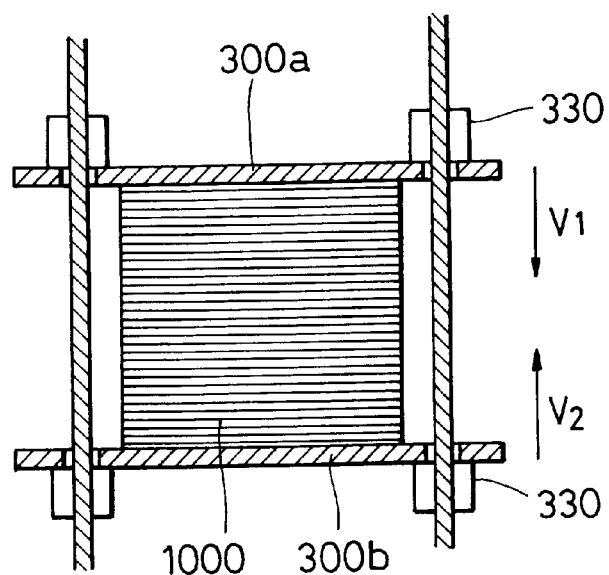
FIG. 22 is a schematic view showing another example of a structure of a working device using free fall.

Then, the fibrous material laminate 1000 fixed by the plates 300a and 300b is moved down (see FIG. 21A). When the temperature of the fibrous material laminate 1000 reaches a desired temperature, second driving systems 330 (see FIG. 22) mounted on the upper and lower plates 300a and 300b move in directions v1 and v2, respectively, thereby compressing the fibrous material laminate 1000 to a desired thickness in order to obtain a desired density. That is, as shown in FIG. 21B, the upper plate 300a moves at the sum of the acceleration g and a low constant speed v1, and the lower plate 300b moves at a speed obtained by subtracting a low constant speed v2 from the acceleration g.

According to the above, the fibrous material laminate 1000 is heated while cancelling the influence of gravity acting on the fibers in the heating process performed until thermobonding characteristics appear, and is then compressed while cancelling the influence. After compression, the speed is promptly decreased, the fibrous material laminate 1000 is taken out of the furnace to be cooled, and the bonding structure is fixed. This makes it possible to obtain a fiber laminate 1100 worked into a desired compression state. It is preferable to promptly perform cooling so that the compression state does not change during cooling. The temperature inside the furnace may be quickly changed to a temperature below the melting point of fiber.

Figure 23:
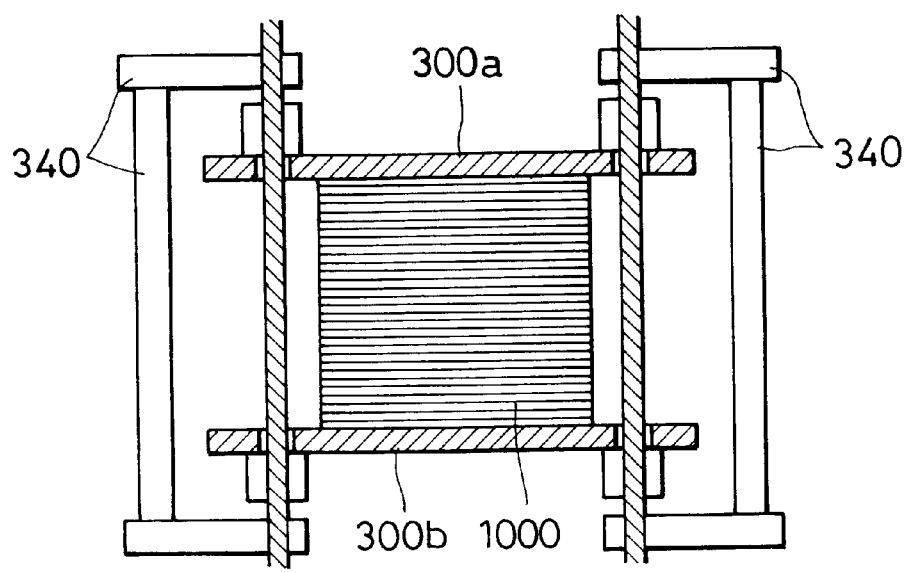
FIG. 23 is a schematic view showing a further example of a structure of a working device using free fall.

For heating in a short time, infrared heaters 340 may be mounted as auxiliary heating means on the plates 300a and 300b, which moves down at a high speed in the furnace, as shown in FIG. 23. It is also preferable to mount a cooling device for quickly lowering the temperature below the melting point.

In the compression process with gravity cancelled, it is possible to use inertial force acting on each fiber due to a sudden stop, instead of providing the second driving systems.

Figure 24A:
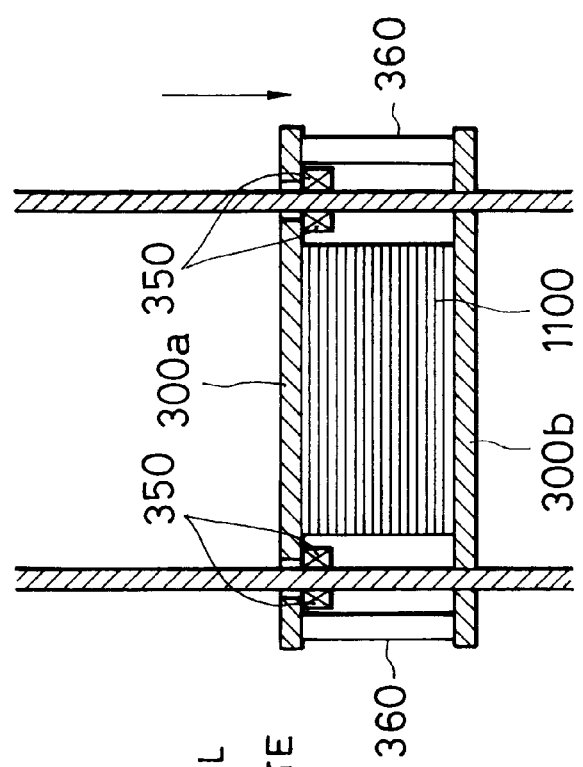
FIGS. 24A and 24B are schematic views showing a further example of a working device using free fall.
Figure 24B:
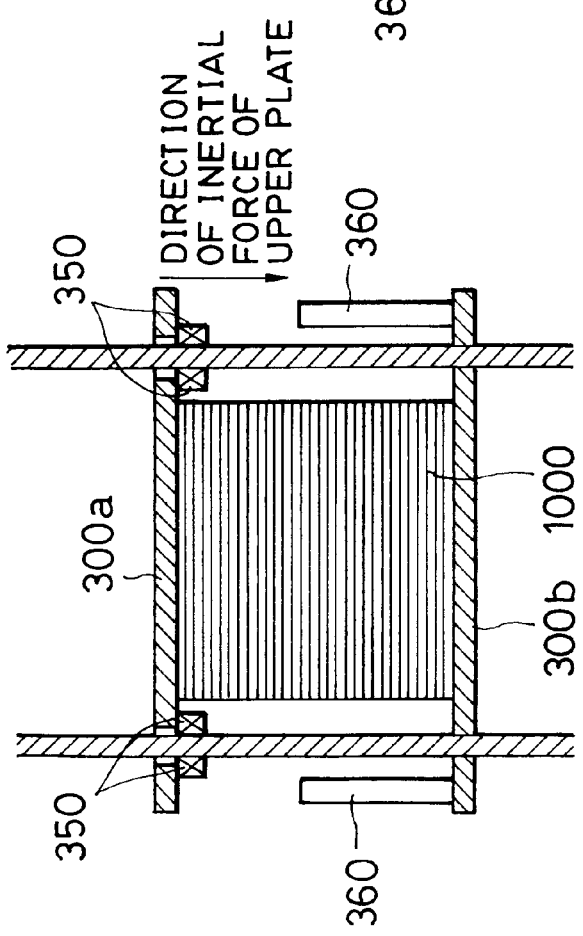

As shown in FIGS. 24A and 24B, it is possible to use inertial force of the upper plate 300a at a sudden stop. For example, after the upper plate 300a moves down together with the first driving system, it is freed by releasing fixing members 350 for fixing the upper plate 300a, as shown in FIG. 24A, and continues its movement by inertial force. The upper plate 300a then contacts spacers 360 for defining a desired thickness, and stops, as shown in FIG. 24B. In order to prevent the upper plate 300a from repulsively moving up due to the contact with the spacers 360, the fixing members 350 lock the wires and the upper plate 300a again. Since compression is performed at a much higher acceleration (deceleration) than gravity acting on fibers forming the fiber laminate 1100 by using this means, the influence of gravity during compression is substantially negligible.

While the above-described compression is performed while gravity is substantially cancelled, it may be limited to an extent to which uniformity is easily maintained, and a normal mechanical compression may be performed outside the furnace in order to obtain a desired density. In this case, residual heat of the fiber may be used.

A further embodiment of the present invention will be described, in which a biaxial fiber is similarly used.

Figure 25:
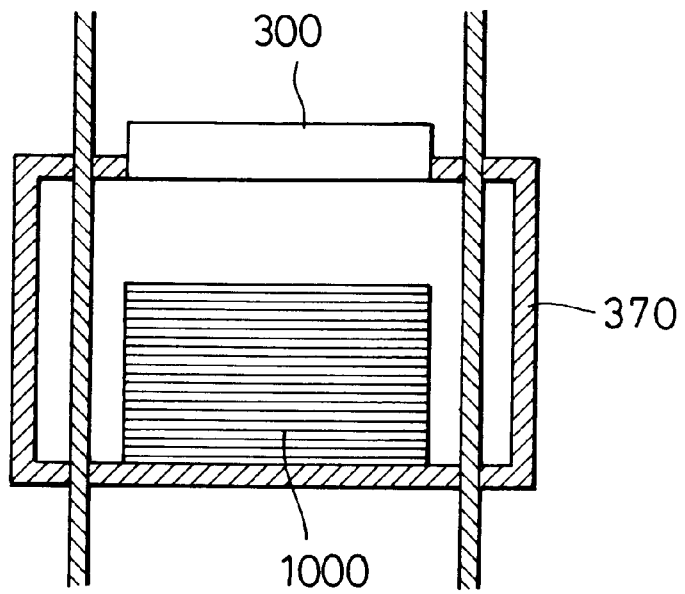
FIG. 25 is a schematic view showing a further structure of a working device using free fall.

Referring to FIG. 25, a fibrous material laminate 1000 to be heated is put into a closed box (fall chamber) 370 to freely fall. The closed box 370 is provided with a guide portion (not shown) for falling therealong inside a heating furnace, and a lock portion (not shown) for upward movement. The closed box 370 is also provided with a blower fan 300 for feeding hot air from the heating furnace into the closed box 370. While the closed box 370 does not freely fall at a complete gravitational acceleration g because of air resistance, it is possible to obtain a gravity cancelling effect that is substantially sufficient as a means for solving the problems.

While compression may be performed outside the furnace, it is preferable to perform compression while reducing the influence of gravity, for example, by using inertial force.

In a case in which working is done in the above-described dry condition, static electricity arises between fibers. Static electricity may be removed before and after the fiber working process. By controlling the static electricity removing state, the influence of gravity is cancelled by the fiber layers which repel each other, and a substantially uniform fiber layer state is obtained.

By controlling the static electricity removing state, it is also possible to positively form a layer state having a desired distribution. For example, when the space between fibers is reduced by sufficiently removing static electricity from a part of the fiber material, and a fibrous material laminate placed thereon is thermoformed without sufficiently removing static electricity therefrom, a fiber laminate including an upper coarse part and a low dense part is produced.

Description will be given below of a further embodiment in which a fiber laminate is produced without any influence of static electricity.

Figure 26:
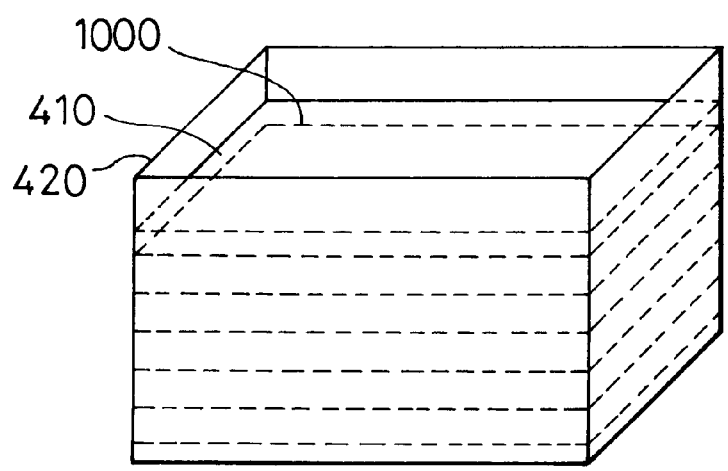
FIG. 26 is a schematic view showing a structure for working in liquid.

FIG. 26 is a schematic view showing a structure of the embodiment. In FIG. 26, numerals 1000, 410, and 420 denote a fibrous material laminate, liquid, and a container for housing the fibrous material laminate 1000. The liquid 410 has a density equivalent to that of the fiber material, and the fibrous material laminate 1000 is floating in the liquid 410. Since the fibrous material laminate 1000 is floating in the liquid 410, the weight of fibers is cancelled by the buoyant force with respect to the fluid 410, and the fibrous material laminate 1000 is prevented from settling down due to its own weight. In comparison with a case in which the fibrous material laminate 1000 is heated in the air, it is possible to use a liquid having a higher thermal conductivity than that of air, which shortens the heating period. In order to shorten the heating period, however, it is preferable that the specific heat of the liquid be low. When the surface tension γ is high, fibers sometimes float on the surface of the liquid, although this depends on the fiber diameter and density. Therefore, it is preferable that the surface tension γ be low.

The fiber laminate formed in the above-described processes is worked by being cut into a desired shape, or by other means, and is placed in an ink tank so as to serve as an effective fiber absorber that shows desired characteristics.

While the biaxial fibers are used in the embodiments described above, fibers made by blending more than two types of fibers, low melting point fibers and high melting point fibers, may be used. In this case, it is possible to prevent nonuniform density due to softening of high melting point fibers.

While the fiber laminate worked by the above-described methods can serve as an absorber disposed in the ink tank, it may be used for other purposes by appropriately controlling the compression state. For example, the fiber laminate can form a part of a structure of a car by being compressed to have a high density and a high hardness. The fiber laminate can be applied to various technical fields.

As is evident from the above description, only one surface or a part of the heated fiber does not move down in the direction of gravity. The influence of gravity on the fiber absorber is controlled by various structures, so that the fiber absorber is not likely to be influenced by gravity. Therefore, it is possible to prevent fiber from being crushed due to its own weight and to form a fiber absorber having a more uniform density.

It is possible to obtain a fiber absorber that is entirely put in a substantially uniform compression state or an intentionally controlled compression state.

Furthermore, a liquid supply container is constituted by the fiber absorber that is not undesirably densified due to gravity. This reduces the amount of ink remaining in the container, and stabilizes ink supply performance.

By using a fiber absorber having a more uniform density, it is possible to maintain a stable ink supply performance from the beginning to the end of use of ink.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A fiber laminate production method wherein fibrous materials oriented in almost a same direction are stacked and thermoformed, said production method comprising the step of controlling an influence of gravity on a laminate of said fibrous materials during thermoforming.

2. A fiber laminate production method according to claim 1, wherein said laminate of said fibrous materials is rotated in said step of controlling the influence of gravity.

3. A fiber laminate production method according to claim 2, wherein a center axis of rotation is orthogonal to a fiber oriented direction, and to a direction of gravity.

4. A fiber laminate production method according to claim 2, wherein a center axis of rotation is parallel to a fiber oriented direction, and is orthogonal to a direction of gravity.

5. A fiber laminate production method according to claim 2, wherein a center axis of rotation is parallel to a stacking direction of said fibrous material laminate, and is orthogonal to a direction of gravity.

6. A fiber laminate production method according to claim 2, wherein a center axis of rotation lies at an approximate center of said fibrous material laminate.

7. A fiber laminate production method according to claim 2, wherein a center axis of rotation is offset from an approximate center of said fibrous material laminate.

8. A fiber laminate production method according to claim 2, wherein a center axis of rotation lies outside said fibrous material laminate.

9. A fiber laminate production method according to claim 1, wherein a fiber direction of said fibrous materials is placed substantially parallel to a direction of gravity in said step of controlling the influence of gravity.

10. A fiber laminate production method according to claim 9, wherein a fibrous material laminate, which is formed by stacking said fibrous materials so that a fiber direction of said fibrous materials is substantially parallel to a direction of gravity, is moved in the direction of gravity, and receives warm air halfway.

11. A fiber laminate production method according to claim 9, wherein a fibrous material laminate, which is formed by stacking said fibrous materials so that a fiber direction of said fibrous materials is substantially parallel to a direction of gravity, is inverted a plurality of times during movement.

12. A fiber laminate production method according to claim 1, wherein a fibrous material laminate, which is formed by stacking said fibrous materials so that a fiber direction of said fibrous materials is substantially orthogonal to a direction of gravity, is successively inverted in said step of controlling the influence of gravity.

13. A fiber laminate production method according to claim 1, wherein air is supplied, from a direction substantially opposite from a direction of gravity, to a fibrous material laminate, which is formed by stacking said fibrous materials in a direction substantially orthogonal to a direction of gravity, in said step of controlling the influence of gravity.

14. A fiber laminate production method according to claims 13, wherein said air is warm air.

15. A fiber laminate production method according to claim 14, wherein said fibrous material laminate is compressed when said warm air is supplied.

16. A fiber laminate production method according to claim 1, wherein a substantially free fall state is used for said fibrous material laminate in said step of controlling the influence of gravity.

17. A fiber laminate production method according to claim 1, wherein said fibrous material laminate is floated in a liquid having a density substantially equivalent to that of said fibrous material laminate in said step of controlling the influence of gravity.

18. A fiber laminate production method according to claim 1, further comprising a cooling step subsequent to said thermoforming step.

19. A fiber laminate produced by the fiber laminate production method of claim 1.

20. A fiber laminate according to claim 19, wherein a fiber forming said fibrous materials is made of a thermoplastic olefin resin.

21. A fiber laminate according to claim 20, wherein said fiber is composed of two types of materials so as to have a concentric cross section, and wherein a center material is made of polypropylene and a peripheral material is made of polyethylene.

22. A liquid reservoir containing a fiber laminate according to claim 19 for storing liquid to be used in recording.

23. A liquid reservoir according to claim 22, comprising a negative pressure generating member containing chamber for holding the fiber laminate as a negative pressure generating member, a liquid supply section, and an air communicating section;

a liquid chamber having a communicating section communicating with said negative pressure generating member containing chamber, and for forming a substantially enclosed space and storing liquid to be supplied to said negative pressure generating member containing chamber; and a partition for separating said negative pressure generating member containing chamber and said liquid chamber, forming said communicating section, and having an air intake path for leading air adjacent to said communicating section on a side of said negative pressure generating member containing chamber.

24. A liquid-jetting head cartridge comprising a liquid reservoir according to claim 22 and a liquid-jetting head for jetting the liquid contained in said liquid reservoir.

25. A liquid-betting head cartridge according to claim 24, wherein said liquid-jetting head and said liquid reservoir are detachable.

26. A fiber laminate production method according to claim 14, wherein a fiber forming said fibrous materials is made of a thermoplastic olefin resin, wherein said fiber is made of two types of materials so as to have a concentric cross section, wherein a center material is made of polypropylene and a peripheral material is made of polyethylene, and wherein a temperature of said air is higher than a melting point temperature of polyethylene and lower than a melting point temperature of polypropylene.

27. A fiber laminate production method wherein fibrous materials oriented in almost a same direction are stacked and thermoformed, said production method comprising:

a step for causing to let warm air into a fibrous material lamented which is laminated in the direction crossing a direction of gravity from a direction opposite to the direction of gravity, a step for compressing the fibrous material laminate when supplying said warm air, and a step for cooling after said thermoforming.

28. A fiber laminate production method according to claim 14, wherein said fiber is made of two types of materials so as to have a concentric cross section, wherein a center material is made of polypropylene and peripheral material is made of polyethylene, and wherein a temperature of said air is higher than a melting point of temperature of polyethylene and lower than a melting point temperature of polypropylene.

* * * * *

UNITED STATES PATENT AND TRADEMARK OFFICE
CERTIFICATE OF CORRECTION

PATENT NO. : 6,652,949 B2
DATED : November 25, 2003
INVENTOR(S) : Shuzo Iwanaga et al.

It is certified that error appears in the above-identified patent and that said Letters Patent is hereby corrected as shown below:

<u>Column 16,</u>
Line 8, "comprising" should read -- comprising: --;
Line 30, "liquid-betting" should read -- liquid-jetting --;
Line 46, "lamented" should read -- laminate --;
Line 48, "gravity," should read -- gravity; --;
Line 51, "air, and" should read -- air; and --; and
Line 58, "point of" should read -- point --.

Signed and Sealed this

Fifteenth Day of June, 2004

JON W. DUDAS
*Acting Director of the United States Patent and Trademark Office*